(12) United States Patent
Saito et al.

(10) Patent No.: US 9,959,973 B2
(45) Date of Patent: May 1, 2018

(54) MULTILAYER CERAMIC CAPACITOR AND METHOD FOR MANUFACTURING SAME

(71) Applicant: Murata Manufacturing Co., Ltd., Nagaokakyo-shi, Kyoto-fu (JP)

(72) Inventors: Yoshito Saito, Nagaokakyo (JP); Yasuhiro Nishisaka, Nagaokakyo (JP); Makoto Ogawa, Nagaokakyo (JP); Akihiro Tsuru, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 59 days.

(21) Appl. No.: 14/853,088

(22) Filed: Sep. 14, 2015

(65) Prior Publication Data

US 2016/0086733 A1    Mar. 24, 2016

(30) Foreign Application Priority Data

Sep. 19, 2014  (JP) ................................ 2014-191243
Aug. 3, 2015   (JP) ................................ 2015-153322

(51) Int. Cl.
  *H01G 4/30* (2006.01)
  *H01G 4/232* (2006.01)
  *H01G 4/008* (2006.01)
  *H01G 4/12* (2006.01)

(52) U.S. Cl.
  CPC ......... *H01G 4/2325* (2013.01); *H01G 4/0085* (2013.01); *H01G 4/1227* (2013.01); *H01G 4/30* (2013.01)

(58) Field of Classification Search
  CPC ............ H01G 4/30; H01G 4/005; H01G 4/12; H01G 4/228; H01G 4/012; H01G 11/00; H01G 4/1272
  See application file for complete search history.

(56) References Cited

U.S. PATENT DOCUMENTS 4,906,405 A  *  3/1990   Nakatani ................. H01B 1/08
                                                        106/1.23
8,724,291 B2    5/2014   Kawasaki et al.
8,730,646 B2    5/2014   Kawasaki et al.
          (Continued)

FOREIGN PATENT DOCUMENTS

CN          101587775 A       11/2009
CN          103390498 A       11/2013
          (Continued)

*Primary Examiner* — Nguyen Ha
(74) *Attorney, Agent, or Firm* — Arent Fox LLP

(57) ABSTRACT

A multilayer ceramic capacitor that includes a layered body in which dielectric layers and internal electrode layers are layered alternately, an external electrode on a surface of the layered body and a plating layer on a surface of the external electrode. The external electrode contains Cu, and a protective layer containing $Cu_2O$ is provided at a joining portion between the external electrode and the plating layer. When heat is applied to the layered body after the external electrode is removed, a ratio of an arithmetic mean value Xa of a quantity of hydrogen generated per unit temperature in a range higher than or equal to 350° C. with respect to an arithmetic mean value Y of a quantity of hydrogen generated per unit temperature in a range higher than or equal to 230° C. and lower than or equal to 250° C. (Xa/Y) is less than or equal to 0.66.

14 Claims, 8 Drawing Sheets

(56) References Cited

U.S. PATENT DOCUMENTS

| | | |
|---|---|---|
| 9,330,848 B2 | 5/2016 | Taseda et al. |
| 2008/0118721 A1 | 5/2008 | Horie et al. |
| 2009/0291317 A1 | 11/2009 | Kawasaki et al. |
| 2012/0140374 A1 | 6/2012 | Kawasaki et al. |
| 2013/0128411 A1* | 5/2013 | Tahara .................... C25D 3/56 361/321.2 |
| 2013/0299215 A1* | 11/2013 | Taseda .................... H01G 4/30 174/255 |
| 2014/0029157 A1 | 1/2014 | Kwag et al. |
| 2016/0211076 A1 | 7/2016 | Taseda et al. |

FOREIGN PATENT DOCUMENTS

| | | |
|---|---|---|
| JP | S64-80011 A | 3/1989 |
| JP | H0757959 A | 3/1995 |
| JP | H07057959 A | 3/1995 |
| KR | 10-2008-7000401 B1 | 9/2009 |

\* cited by examiner

HEAT TREATMENT

MULTILAYER CERAMIC CAPACITOR AND METHOD FOR MANUFACTURING SAME

BACKGROUND OF THE INVENTION

Field of the Invention

The present invention relates to a multilayer ceramic capacitor and a method for manufacturing the same, and particularly to a multilayer ceramic capacitor having a small quantity of hydrogen and a method for manufacturing the same.

Description of the Background Art

A multilayer ceramic capacitor includes a layered body, which has a plurality of dielectric layers and a plurality of internal electrodes layered alternately, and a pair of external electrodes formed on a surface of the layered body to be conductively connected to the internal electrodes drawn out to the surface of the layered body. Ni-plating is applied to surfaces of the external electrodes to prevent dissolution into solder at the time of mounting. Further, Sn-plating is applied onto Ni-plating films to improve soldering performance at the time of mounting with soldering. The plating with Ni and Sn is typically formed by an electroplating method.

Japanese Patent Laying-Open No. 1-80011 discloses that a chemical reaction in a plating step generates hydrogen and the hydrogen is occluded into an internal electrode and that the occluded hydrogen gradually reduces a dielectric layer in a periphery to cause a problem such as deterioration of an insulation resistance. It also discloses that, when an internal electrode having noble metal (for example, Ag—Pd alloy) as a main component is used, the solution for the problem is to add metal (for example, Ni), which suppresses absorption of hydrogen, to the internal electrode.

SUMMARY OF THE INVENTION

However, in recent years, base metal such as Ni rather than noble metal such as Ag or Pd is often used as material of an internal electrode to reduce the cost for material.

Moreover, although Japanese Patent Laying-Open No. 1-80011 discloses that Ni is "metal which inactivates absorption of hydrogen," it has been found according to the studies conducted by the inventors that even the use of Ni for an internal electrode may lead to deterioration of an insulation resistance due to an influence of hydrogen.

Moreover, it has been also known that some base metals such as Ni used as constituting material for internal electrodes and external electrodes including a plating layer have a high ability to absorb hydrogen and that the absorbed hydrogen is emitted to some extent depending on a temperature condition. Particularly, it remarkably appears when a high-temperature high-humidity load test such as a PCBT test is conducted, and there is a case where the absorbed hydrogen is emitted and diffused to the dielectric layer to cause deterioration of an insulation resistance (IR).

Thus, in order to avoid negative effects such as deterioration of an insulation resistance due to a multilayer ceramic capacitor taking in hydrogen generated in a plating step or the like, it is desirable to reduce an absolute quantity of hydrogen included in the multilayer ceramic capacitor.

The present invention solves the problem described above, and its object is to provide a multilayer ceramic capacitor capable of suppressing diffusion of hydrogen to a dielectric layer and preventing deterioration of an insulation resistance by reducing the quantity of hydrogen included in the multilayer ceramic capacitor.

Multilayer ceramic capacitors in accordance with first and second aspects of the present invention include a layered body and an external electrode. In the layered body, dielectric layers made of ceramic dielectric material and internal electrode layers having base metal as a main component are layered alternately. The external electrode has an external electrode main body formed on a surface of the layered body to be conductively connected to the internal electrodes drawn out to the surface of the layered body, and a plating layer formed on a surface of the external electrode. The external electrode main body contains Cu, and a protective layer containing $Cu_2O$ is provided at a joining portion between the external electrode main body and the plating layer.

In the multilayer ceramic capacitor in accordance with the first aspect of the present invention, when heat is applied to the layered body after the external electrode is removed therefrom, and a quantity of hydrogen generated from the layered body is measured, a ratio of an arithmetic mean value Xa of a quantity of hydrogen generated per unit temperature in the range higher than or equal to 350° C. with respect to an arithmetic mean value Y of a quantity of hydrogen generated per unit temperature in the range higher than or equal to 230° C. and lower than or equal to 250° C. (Xa/Y) is less than or equal to 0.66.

In the multilayer ceramic capacitor in accordance with the second aspect of the present invention, when heat is applied to the layered body after the external electrode is removed therefrom, and a quantity of hydrogen generated from the layered body is measured, a ratio of a maximum value Xp of a quantity of hydrogen generated per unit temperature in the range higher than or equal to 350° C. with respect to an arithmetic mean value Y of a quantity of hydrogen generated per unit temperature in the range higher than or equal to 230° C. and lower than or equal to 250° C. (Xp/Y) is less than or equal to 0.66.

In the multilayer ceramic capacitors in accordance with the first and second aspects of the present invention, it is preferable that the plating layer is a composite plating layer including an Ni-plating layer and an Sn-plating layer formed on the Ni-plating layer.

With the configuration described above, the plating layer covering the external electrode main body includes the Ni-plating layer serving as a layer for preventing dissolution into solder at the time of mounting and the Sn-plating layer serving to secure wettability with solder at the time of mounting, so that the multilayer ceramic capacitor can be superior in reliability without deterioration of the insulation resistance.

In other words, for example, when the Ni-plating layer is formed by electroplating, there is a case where hydrogen generated in the plating step passes through the external electrode main body, reaches the internal electrodes, and diffuses to the dielectric layers to deteriorate the insulation resistance. However, according to the present invention, in the case where heat is added to the layered body after the external electrode is removed therefrom, and the quantity of hydrogen generated from the layered body is measured, a ratio of an arithmetic mean value or maximum value of a quantity of hydrogen generated per unit temperature in a predetermined temperature range with respect to an arithmetic mean value of a quantity of hydrogen generated per unit temperature in other predetermined temperature range is specified to a predetermined ratio. Accordingly, deterioration of the insulation resistance due to diffusion of hydrogen to the dielectric layers can be prevented efficiently, so that a highly reliable multilayer ceramic capacitor as described above can be provided.

In the multilayer ceramic capacitors in accordance with the first and second aspects of the present invention, it is preferable that the protective layer further contains CuO.

By allowing the protective layer containing $Cu_2O$ to further contain CuO, entering of hydrogen into the layered body through the external electrode main body can be suppressed or prevented more securely.

A method for manufacturing a multilayer ceramic capacitor in accordance with the present invention includes a layered body forming step of forming a layered body in which dielectric layers made of ceramic dielectric material and internal electrode layers having base metal as a main component are layered alternately, an external electrode main body forming step of forming an external electrode main body on a surface of the layered body to be conductively connected to the internal electrodes drawn out to the surface of the layered body, an electroplating step of forming a plating layer on a surface of the external electrode main body by electroplating, and a heat treatment step of heat-treating a ceramic element body having a plating layer, which is a layered body having the external electrode main body and the plating layer formed thereon, under a temperature condition higher than or equal to 150° C. and emitting hydrogen taken into the ceramic element body having a plating layer in the electroplating step to outside.

In the method for manufacturing a multilayer ceramic capacitor in accordance with the present invention, it is preferable that the external electrode main body forming step includes a step of forming an external electrode main body containing Cu. Moreover, in that case, it is preferable that the method for manufacturing a multilayer ceramic capacitor in accordance with the present invention further includes an oxidation treatment step of performing an oxidation treatment with respect to the external electrode main body containing Cu.

By forming the external electrode main body containing Cu in the external electrode main body forming step and performing the oxidation treatment to the external electrode main body in the oxidation treatment step, a protective layer containing oxide of Cu can be formed on a surface of the external electrode main body. Therefore, with a structure including the protective layer between the external electrode main body and the plating layer, the multilayer ceramic capacitor can be provided which can suppress entering of hydrogen into the layered body through the external electrode main body.

In the method for manufacturing a multilayer ceramic capacitor in accordance with the present invention, it is preferable that, upon performing the oxidation treatment, the oxidation treatment is performed under a condition in which a protective layer containing $Cu_2O$ or containing $Cu_2O$ and CuO is formed on a surface of the external electrode main body.

By performing the oxidation treatment to the surface of the external electrode main body under a predetermined condition, the protective layer containing $Cu_2O$ or containing $Cu_2O$ and CuO can be formed. Therefore, for example, by forming a plating layer such as an Ni-plating layer on it, a structure in which a protective layer containing $Cu_2O$ or containing $Cu_2O$ and CuO is formed between the external electrode main body and the plating layer, so that the multilayer ceramic capacitor can be provided which can more securely suppress or prevent entering of hydrogen into the layered body through the external electrode main body.

In the method for manufacturing a multilayer ceramic capacitor in accordance with the present invention, it is preferable that the electroplating step is a step of forming an Ni-plating layer on a surface of the external electrode main body by electroplating. Moreover, in that case, it is preferable that the method for manufacturing a multilayer ceramic capacitor in accordance with the present invention further includes a step of forming an Sn-plating layer on the Ni-plating layer by electroplating after the heat treatment step.

By performing the heat treatment after forming the Ni-plating layer on the surface of the external electrode main body by the electroplating method and thereafter further forming the Sn-plating layer, the multilayer ceramic capacitor can be provided which can be less susceptible to the influence of hydrogen generated in the Ni-plating step and suppress deterioration of the insulation resistance. Moreover, by including the Ni-plating layer serving as a layer preventing dissolution into solder at the time of mounting and the Sn-plating layer serving to secure wettability with solder at the time of mounting, a highly reliable multilayer ceramic capacitor can be provided.

The multilayer ceramic capacitors in accordance with the first and second aspects of the present invention are configured such that, when heat is applied to the layered body after the external electrode is removed therefrom, and a quantity of hydrogen generated from the layered body is measured, a ratio of an arithmetic mean value Xa or a maximum value Xp of a quantity of hydrogen generated per unit temperature in the range higher than or equal to 350° C. with respect to an arithmetic mean value Y of a quantity of hydrogen generated per unit temperature in the range higher than or equal to 230° C. and lower than or equal to 250° C. (Xa/Y or Xp/Y) becomes less than or equal to 0.66, so that a quantity of hydrogen in the layered body (ceramic element body) causing deterioration of the dielectric layer becomes smaller.

Consequently, a highly reliable multilayer ceramic capacitor capable of preventing deterioration of the insulation resistance can be provided.

Moreover, in the multilayer ceramic capacitors in accordance with the first and second aspects of the present invention, since the external electrode main body contains Cu, and the protective layer containing $Cu_2O$ is provided at a joining portion between the external electrode main body and the plating layer, entering of hydrogen into the layered body through the external electrode main bodies can be suppressed or prevented, so that more highly reliable multilayer ceramic capacitor can be provided.

Moreover, the quantity of hydrogen in the present invention includes both hydrogen of m/z=2 (hydrogen gas ($H_2$)) and hydrogen of m/z=1 (hydrogen present as hydrogen ion or hydrogen atom). Generally, the quantity of hydrogen of m/z=2 and the quantity of hydrogen of m/z=1 can be calculated by the TDS (Thermal Desorption Spectrometry) analysis.

According to the studies conducted by the inventors, hydrogen as a cause of deterioration of the insulation resistance is presumed to be hydrogen of m/z=1 and m/z=2. However, the present invention mainly focuses on a quantity of hydrogen of m/z=2 (hydrogen gas).

Moreover, according to the method for manufacturing a multilayer ceramic capacitor in accordance with the present invention, after the plating layer is formed on the surface of the external electrode main body by electroplating, the ceramic element body having the plating layer, which is the layered body having the external electrode main body and the plating layer formed thereon, is heated under the temperature condition of higher than or equal to 150° C., and at least a part of hydrogen taken into the ceramic element body having the plating layer in the electroplating step is emitted to outside. Therefore, a quantity of hydrogen which is contained in the ceramic element body having a plating layer, partially absorbed by the internal electrodes, and being a cause of deterioration of the dielectric layers can be made smaller.

Consequently, a highly reliable multilayer ceramic capacitor capable of preventing deterioration of the insulation resistance can be manufactured securely.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

In the following, an embodiment of the present invention will be shown to describe the features of the present invention more in detail.

Figure 1:
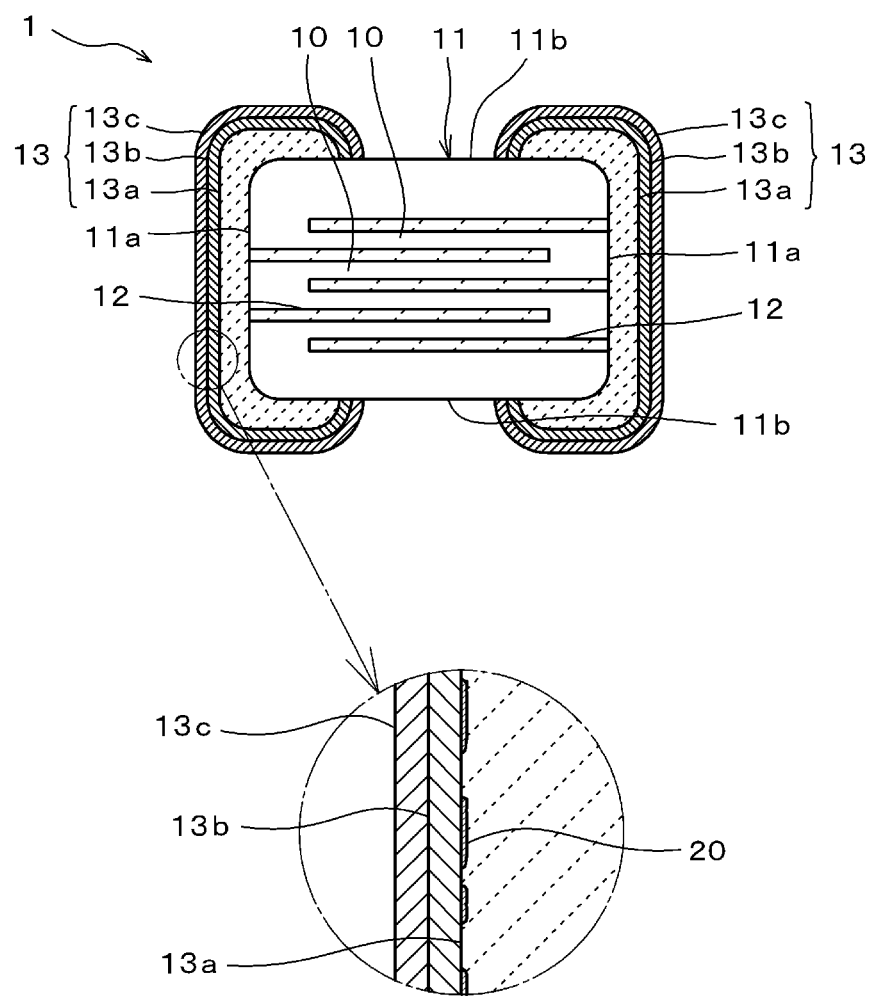
FIG. 1 represents a front cross-sectional view representing a configuration of a multilayer ceramic capacitor in accordance with an embodiment of the present invention.

FIG. 1 is a front cross-sectional view representing a configuration of a multilayer ceramic capacitor 1 in accordance with one embodiment of the present invention.

This multilayer ceramic capacitor 1 includes a layered body 11 (ceramic element body) and a pair of external electrodes 13. Layered body 11 includes a plurality of dielectric layers 10 made of ceramic dielectric material and a plurality of internal electrodes 12 layered through dielectric layers 10. The pair of external electrodes 13 are arranged to be conductively connected to internal electrodes 12 alternately drawn out to a pair of end surfaces 11a of layered body 11 opposing each other.

The pair of external electrodes 13 each includes an external electrode main body 13a having a part formed to take a roundabout path from end surface 11a of layered body 11 to side surfaces 11b, an Ni-plating layer 13b formed to cover a surface of external electrode main body 13a, and an Sn-plating film 13c formed to cover a surface of Ni-plating layer 13b.

It should be noted that, as material constituting dielectric layers 10, dielectric ceramic having $BaTiO_3$ as a main component is used. Other than that, as material constituting dielectric layers 10, dielectric ceramic having $CaTiO_3$, $SrTiO_3$, $CaZrO_3$, or the like as a main component can be used.

Moreover, as conductive material constituting internal electrodes 12, for example, base metal having Ni as a main component is used. Other than that, as conductive material constituting internal electrodes 12, Cu or the like can be used.

Moreover, external electrode main body 13a is so-called baked electrode which is formed, for example, by applying conductive paste including metal powder (Cu powder in this embodiment) and glass to end surfaces 11a of layered body 11 and firing the same. In this embodiment, Cu is used as conductive material constituting external electrode main body 13a. However, other than that, Ag or Ni can be used. Moreover, external electrode main body 13a may be constituted of a conductive resin electrode other than the baked electrode.

The thickness of external electrode main body 13a is not particularly limited, but is, for example, 10 to 50 μm.

Moreover, Ni-plating layer 13b is formed so as to cover a surface of external electrode main body 13a by the electroplating method.

The thickness of Ni-plating layer 13b is not particularly limited, but is, for example, 3 to 5 μm.

Moreover, Sn-plating layer 13c is formed so as to cover the surface of Ni-plating layer 13b by the electroplating method.

The thickness of Sn-plating layer 13c is also not particularly limited, but is, for example, 3 to 5 μm.

Moreover, as shown in FIG. 1, a protective layer 20 containing $Cu_2O$ and CuO is provided at a joining portion between external electrode main body 13a and Ni-plating layer 13b. However, protective layer 20 can be configured to contain $Cu_2O$ without CuO.

When heat is applied to layered body 11 after external electrodes 13 are removed therefrom, and a quantity of hydrogen generated from layered body 11 is measured, multilayer ceramic capacitor 1 with such a configuration is configured such that a ratio of an arithmetic mean value Xa and a maximum value Xp of a quantity of hydrogen generated per unit temperature in the range higher than or equal to 350° C. with respect to an arithmetic mean value Y of a quantity of hydrogen generated per unit temperature in the range higher than or equal to 230° C. and lower than or equal to 250° C. (Xa/Y and Xp/Y) becomes less than or equal to 0.66.

Moreover, it is more preferable to be configured such that, when heat is applied to layered body 11 after external electrodes 13 are removed therefrom, and a quantity of hydrogen generated from layered body 11 is measured, such that an arithmetic mean value Xb of a quantity of hydrogen generated per unit temperature in the range of higher than or equal to 490° C. and lower than or equal to 510° C. with respect to an arithmetic mean value Y of a quantity of hydrogen generated per unit temperature in the range higher than or equal to 230° C. and lower than or equal to 250° C. (Xb/Y) becomes less than or equal to 0.66.

Moreover, it is more preferable to be configured such that, when heat is applied to layered body 11 after external electrodes 13 are removed therefrom, and a quantity of hydrogen generated from layered body 11 is measured, a ratio of an arithmetic mean value Xc of a quantity of hydrogen generated per unit temperature in the range higher than or equal to 400° C. and lower than or equal to 420° C. with respect to an arithmetic mean value Y of a quantity of hydrogen generated per unit temperature in the range higher than or equal to 230° C. and lower than or equal to 250° C. (Xc/Y) becomes less than or equal to 0.66.

As described above, by configuring such that, when heat is added to layered body 11, and a quantity of hydrogen generated from layered body 11 is measured, a ratio of an arithmetic mean value Xa and a maximum value Xp of a quantity of hydrogen generated per unit temperature in the range higher than or equal to 350° C. with respect to an arithmetic mean value Y of a quantity of hydrogen generated per unit temperature in the range higher than or equal to 230° C. and lower than or equal to 250° C. (Xa/Y and Xp/Y) becomes less than or equal to 0.66, a multilayer ceramic capacitor having a small quantity of hydrogen in internal electrodes 12 causing deterioration of dielectric layers 10, in other words, a multilayer ceramic capacitor capable of preventing deterioration of the insulation resistance can be obtained.

Moreover, multilayer ceramic capacitor 1 in accordance with this embodiment includes Ni-plating layer 13b, which is arranged so as to cover external electrode main body 13a and serves as a layer for preventing dissolution into solder at the time of mounting, and Sn-plating layer 13c, which is arranged so as to cover Ni-plating layer 13b and serves to secure wettability with solder at the time of mounting. Thus, with such a configuration, a multilayer ceramic capacitor can be achieved which can prevent deterioration of the insulation resistance and has a high mounting reliability.

Moreover, as described above, multilayer ceramic capacitor 1 in accordance with this embodiment includes protective layer 20 containing $Cu_2O$ and CuO at a joining portion between external electrode main body 13a and Ni-plating layer 13b. Therefore, entering of hydrogen inside through external electrode main body 13a can be suppressed or prevented, and more highly reliable multilayer ceramic capacitor can be provided.

It should be noted that this protective layer 20 preferably has a thickness greater than or equal to 0.1 μm and less than or equal to 1.5 μm.

Moreover, the presence of protective layer 20 can be confirmed by analysis by means of energy dispersive X-ray spectroscopy (EDX) with use of a transmission electron microscope (TEM). It should be noted that an especially great effect can be obtained when protective layer 20 is present to take up greater than or equal to 30% in the length direction of the joining portion (interface) between external electrode main body 13a and Ni-plating layer 13b.

It should be noted that being present to take up greater than or equal to 30% in the length direction of the joining portion (interface) means that a ratio of a total distance (total length) in a region where the presence of protective layer 20 is confirmed with respect to the length (distance) of the observed joining portion (interface) is greater than or equal to 30%.

It should be noted that, also in the case where protective layer 20 contains $Cu_2O$ but does not contain CuO, the effect obtained in the case of the protective layer containing $Cu_2O$ and CuO, in other words, the effect of preventing entering of hydrogen into layered body 11 through external electrode main body 13a can be obtained.

Next, a method for manufacturing this multilayer ceramic capacitor 1 will be described.

(1) Producing Layered Body

Figure 2:
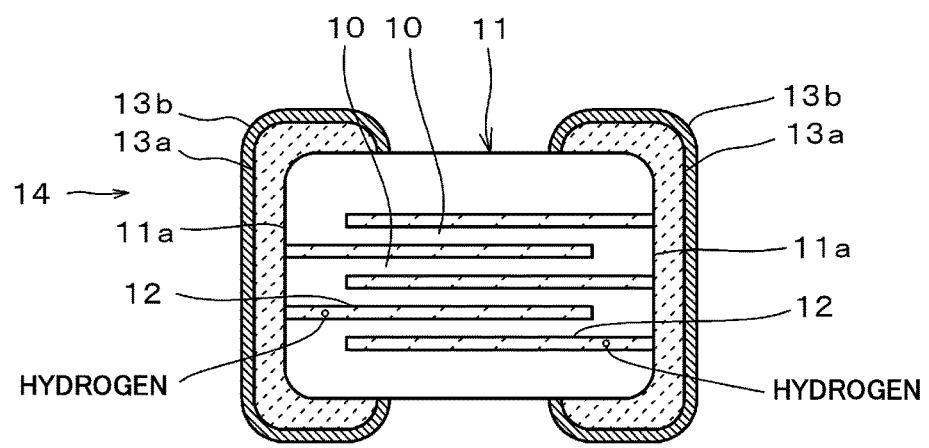
FIG. 2 is a diagram for illustrating a method for manufacturing the multilayer ceramic capacitor in accordance with the embodiment of the present invention and represents a state where Ni-plating layers are formed on surfaces of external electrode main bodies by an electroplating method.

Firstly, a ceramic green sheet including in its surface an internal electrode pattern formed by applying conductive paste for forming the internal electrode and a ceramic green sheet for an outer layer not including the internal electrode pattern are layered and adhered in a predetermined order to form a layered block. The formed layered block is cut and divided into individual chips, and the individual chips are fired, so that layered body (ceramic element body) 11 shown in FIG. 2 is produced.

It should be noted that beveling may be applied to layered body 11 through a method such as barrel polishing or the like.

The method for producing layered body 11 is not particularly limited, and various known methods can be used.

(2) Forming External Electrode Main Body

The conductive paste containing Cu powder, metal powder, and glass is applied to end surfaces 11a of layered body 11 and fired, so that external electrode main bodies 13a are formed. It should be noted that the firing condition is not particularly limited.

The thickness of external electrode main body 13a is set such that, for example, the thickness in the end surface central portion is about 15 μm.

(3) Oxidation Treatment

Next, an oxidation treatment is applied to formed external electrode main bodies 13 to create protective layers 20 (refer to FIG. 1) containing $Cu_2O$ and CuO on the surfaces of external electrode main bodies 13a.

The oxidation treatment is implemented, for example, under the following conditions.

Temperature Condition: higher than or equal to 50° C. and lower than or equal to 900° C.

Atmosphere Condition: oxygen concentration greater than or equal to 30 ppm and less than or equal to 50 ppm Time Condition: longer than or equal to 1 minute and shorter than or equal to 120 minutes It should be noted that the protective layer containing $Cu_2O$ but not containing CuO can be formed by adjusting a condition of the oxidation treatment.

Moreover, the oxidation treatment can be performed after the heat treatment described below.

(4) Forming Ni-Plating Layer

Next, Ni-electroplating is performed to form Ni-plating layer 13b so as to cover a surface of external electrode main body 13a. Accordingly, a layered body 14 having external electrode main body 13a and Ni-plating layer 13b can be obtained (hereinafter, also referred to as "ceramic element body having Ni-plating layer").

The thickness of Ni-plating layer 13b is, for example, about 3 μm.

Hydrogen is generated in this Ni-electroplating step, and a part of the generated hydrogen, as schematically shown in FIG. 2, passes through external electrode main body 13a, enters into layered body (ceramic element body) 11, and reaches also to internal electrodes 12.

(5) Heat Treatment

The layered body having Ni-plating layer 13b formed thereon (ceramic element body 14 having an Ni-plating layer) by the electroplating in the manner as described above is heat-treated in the temperature range higher than or equal to 150° C.

The heat treatment is implemented by, for example, placing ceramic element body 14 having an Ni-plating layer in an oven for a predetermined time period (for example, 60 minutes).

Figure 3:
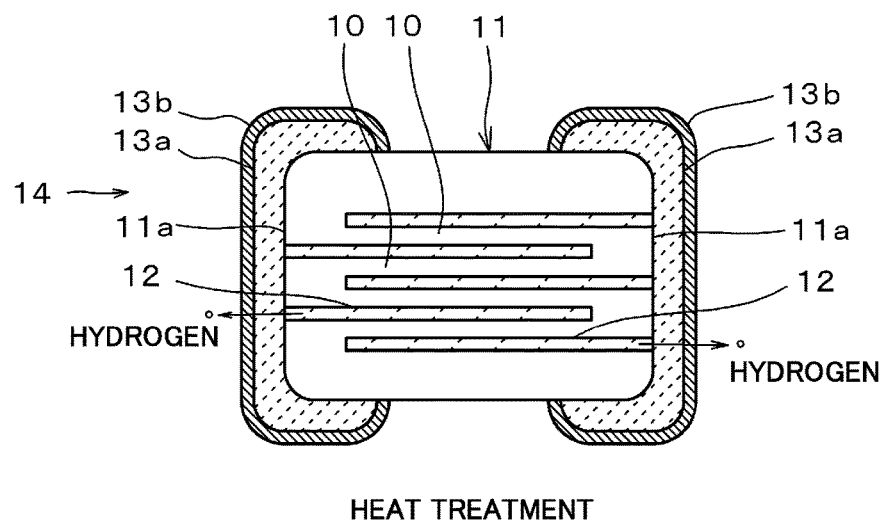
FIG. 3 is a diagram for illustrating a method for manufacturing the multilayer ceramic capacitor in accordance with the embodiment of the present invention, and schematically represents a state where a heat treatment is applied to a layered body (a ceramic element body having an Ni-plating layer) which is in a state where the Ni-plating layers are formed on the surfaces of the external electrode main bodies.

By this heat treatment, hydrogen contained in ceramic element body 14 having an Ni-plating layer and partially absorbed by the internal electrodes, as schematically shown in FIG. 3, passes through external electrode main body 13a and Ni-plating layer 13b and is emitted to outside of ceramic element body 14 having Ni-plating layer.

Since the quantity of hydrogen contained in layered body 11 can be reduced by performing this heat treatment, the multilayer ceramic capacitor capable of suppressing diffusion of hydrogen to the dielectric layer and preventing deterioration of the insulation resistance can be obtained.

(6) Forming Sn-Plating Layer

Next, as shown in FIG. 3, Sn-plating layer 13c is formed on an outer surface of Ni-plating layer 13b by the electroplating method. Here, the thickness of Sn-plating layer 13c is, for example, about 3 μm.

It should be noted that, also in the case where Sn-plating film layer 13c is formed by the electroplating, generation of some hydrogen may occur in the electroplating step. However, since the hydrogen contained in ceramic element body 14 having the Ni-plating layer is emitted to outside in the heat treatment step, the influence of hydrogen becomes enough insignificant.

<Evaluation Test>

In order to evaluate multilayer ceramic capacitor 1 produced based on this embodiment, a multilayer ceramic capacitor (sample) of the sample number 1 in Table 1 produced without applying the heat treatment to the layered body (ceramic element body 14 having the Ni-plating layer) and multilayer ceramic capacitors (samples) of the sample numbers 2 to 4 in Table 1 produced by applying the heat treatment to the layered body (ceramic element body 14 having Ni-plating layer) at different temperatures of 85° C., 150° C., and 600° C. respectively were prepared.

It should be noted that all of the multilayer ceramic capacitors (samples) of the sample numbers 1 to 4 in Table 1 shown below include the Sn-plating layer on the Ni-plating layer.

Moreover, the samples (multilayer ceramic capacitors) of the sample numbers 1 to 4 generally have a capacity of 2.2 μF, a rated voltage of 6.3V, dimensions with a length of 0.6 to 0.7 mm, a width of 0.3 to 0.4 mm, and a height of 0.3 to 0.4 mm. The thickness of the external electrode main body (the thickness of the substantially central region of the end surface of the ceramic element body) is 15 μm. The thickness of the Ni-plating layer is 3 μm. The thickness of the Sn-plating layer is 3 μm.

Then, for each sample of the sample numbers 1 to 4 having a hydrogen content adjusted with different heat treatment conditions, a quantity of hydrogen generated per unit temperature in the range of higher than or equal to the room temperature, in the case where heat is applied to the layer body after the external electrodes are removed therefrom, was examined.

For the measurement of a quantity of hydrogen generated per unit temperature in the range of higher than or equal to the room temperature, samples were prepared from which the external electrodes and the plating films were removed by a method such as polishing.

Then, a behavior of generating hydrogen of m/z=2 was examined by the TDS (Thermal Desorption Spectrometry) analysis. The conditions for the TDS analysis were provided including the temperature rise rate of 20° C./min, the maximum temperature of 700° C., the sampling period of the quantity of generated hydrogen in the unit of 0.5° C., and 10 evaluation samples for each.

The quantitative methods are as follows.

A quantity of hydrogen generated per unit temperature (here, which is the range of 0.5° C.) in the range higher than or equal to 230° C. and lower than or equal to 250° C. is arithmetically averaged. The calculated value is defined as arithmetic mean value Y described above. However, as to the quantity of generated hydrogen, there is a case where a negative value is obtained depending on a state of an analyzing apparatus. In that case, the arithmetic averaging is performed except for that value.

A quantity of hydrogen generated per unit temperature (here, which is the range of 0.5° C.) in the range higher than or equal to 350° C. is arithmetically averaged. The calculated value is defined as arithmetic mean value Xa described above. However, as to the quantity of generated hydrogen, there is a case where a negative value is obtained depending on a state of an analyzing apparatus. In that case, the arithmetic averaging is performed except for that value.

A maximum value of a quantity of hydrogen generated per unit temperature (here, which is the range of 0.5° C.) in the range higher than or equal to 350° C. is calculated. The calculated value is defined as maximum value Xp described above.

A quantity of hydrogen generated per unit temperature (here, which is the range of 0.5° C.) in the range higher than or equal to 490° C. and lower than or equal to 510° C. is arithmetically averaged. The calculated value is defined as arithmetic mean value Xb described above. However, as to the quantity of generated hydrogen, there is a case where a negative value is obtained depending on a state of an analyzing apparatus. In that case, the arithmetic averaging is performed except for that value.

A quantity of hydrogen generated per unit temperature (here, which is the range of 0.5° C.) in the range higher than or equal to 400° C. and lower than or equal to 420° C. is arithmetically averaged. The calculated value is defined as arithmetic mean value Xc described above. However, as to the quantity of generated hydrogen, there is a case where a negative value is obtained depending on a state of an analyzing apparatus. In that case, the arithmetic averaging is performed except for that value.

Based on arithmetic mean values Xa, Xb, Xc, Y and maximum value Xp calculated in the manner described above, ratios of arithmetic mean values Xa, Xb, Xc and maximum value Xp with respect to arithmetic mean value Y are calculated (Xa/Y, Xb/Y, Xc/Y, Xp/Y).

Among the ratios calculated in the manner described above, a ratio of arithmetic mean value Xb with respect to arithmetic mean value Y (hydrogen generation ratio) (Xb/Y) for each sample is particularly shown in Table 1.

Moreover, FIGS. 4 to 7 represent results of the TDS analysis for samples heat-treated under the following conditions respectively.

Figure 4:
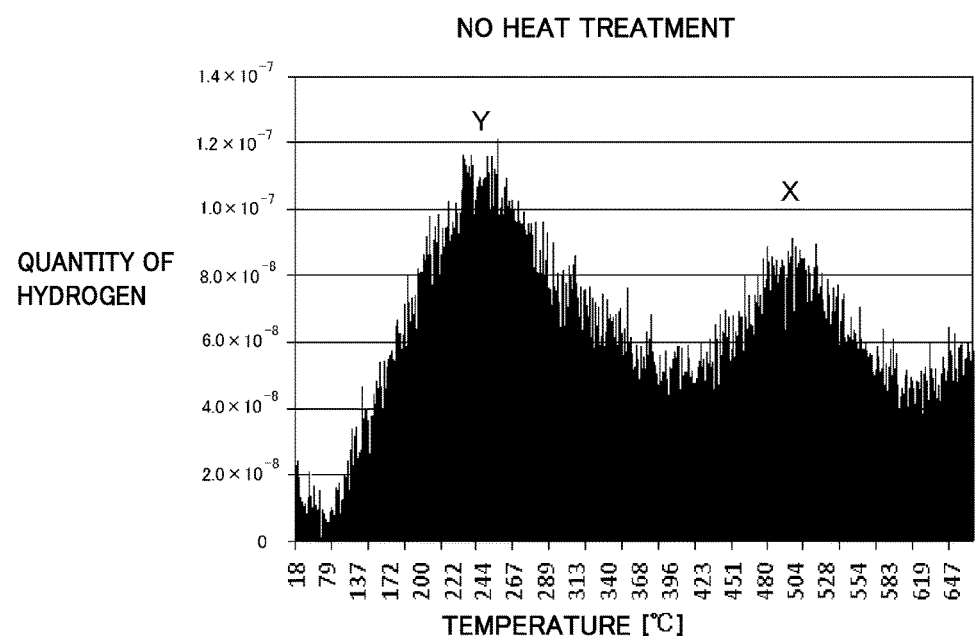
FIG. 4 represents a relationship between a temperature and a quantity of hydrogen in the TDS analysis for a sample which is not heat-treated.

FIG. 4 represents a relationship between a temperature and a quantity of hydrogen in the TDS analysis for the sample without the heat treatment.

Figure 5:
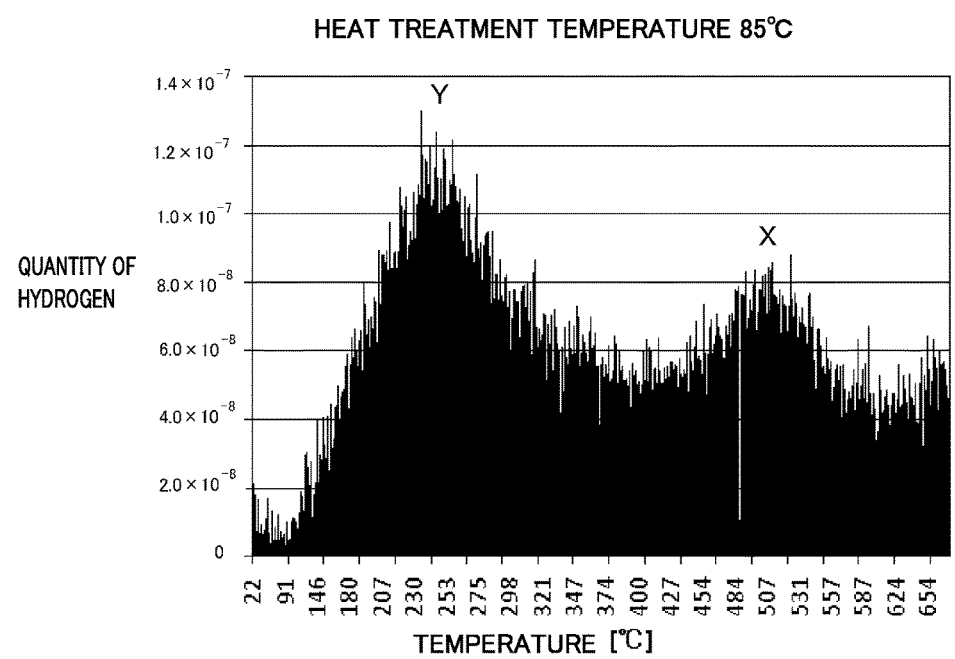
FIG. 5 represents a relationship between a temperature and a quantity of hydrogen in the TDS analysis for a sample which is heat-treated at 85° C.

FIG. 5 represents a relationship between a temperature and a quantity of hydrogen in the TDS analysis for a sample heat-treated at 85° C.

Figure 6:
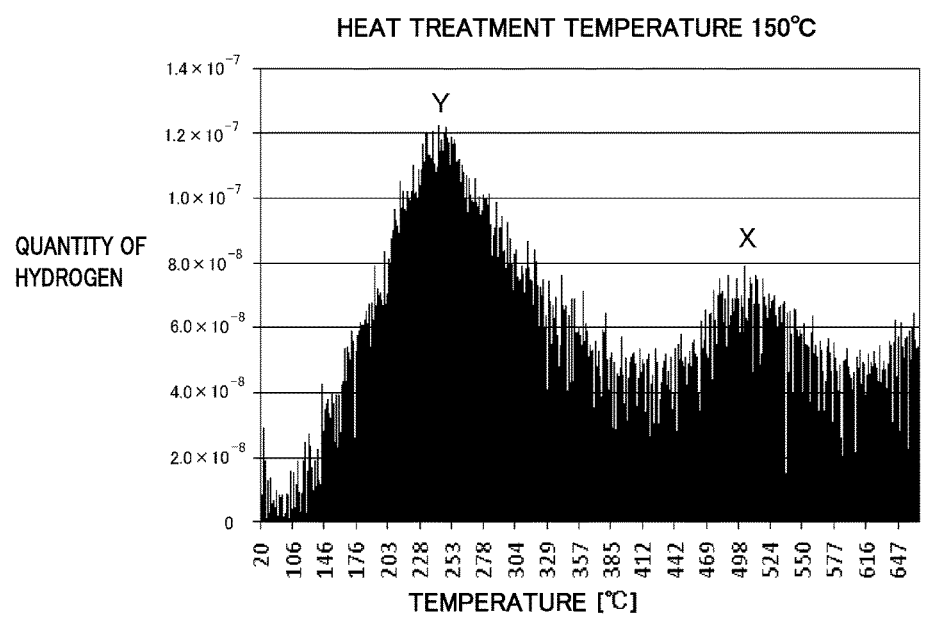
FIG. 6 represents a relationship between a temperature and a quantity of hydrogen in the TDS analysis for a sample heat-treated at 150° C.

FIG. 6 represents a relationship between a temperature and a quantity of hydrogen in the TDS analysis for a sample heat-treated at 150° C.

Figure 7:
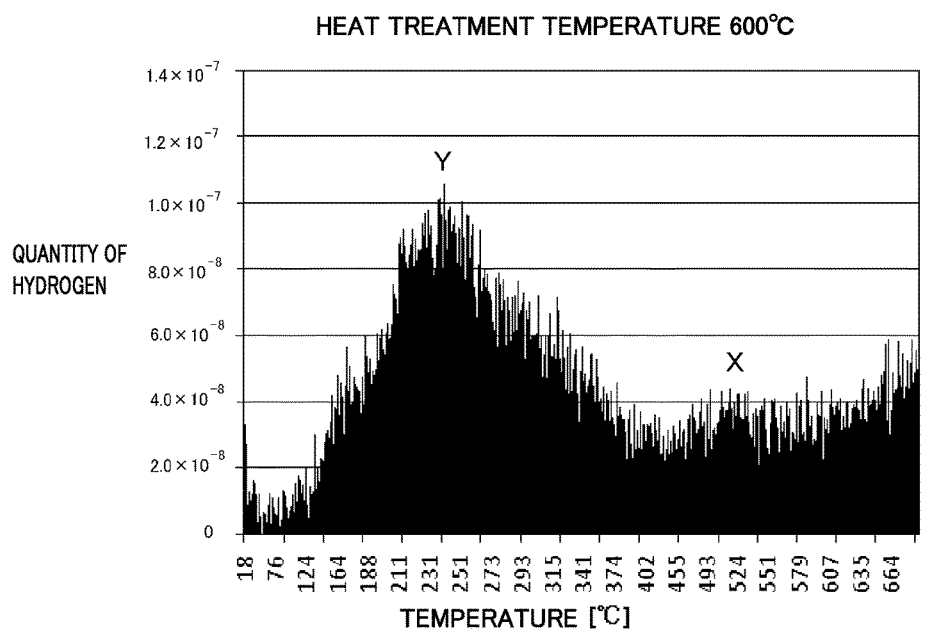
FIG. 7 represents a relationship between a temperature and a quantity of hydrogen in the TDS analysis for a sample heat-treated at 600° C.

FIG. 7 represents a relationship between a temperature and a quantity of hydrogen in the TDS analysis for a sample heat-treated at 600° C.

Figure 8:
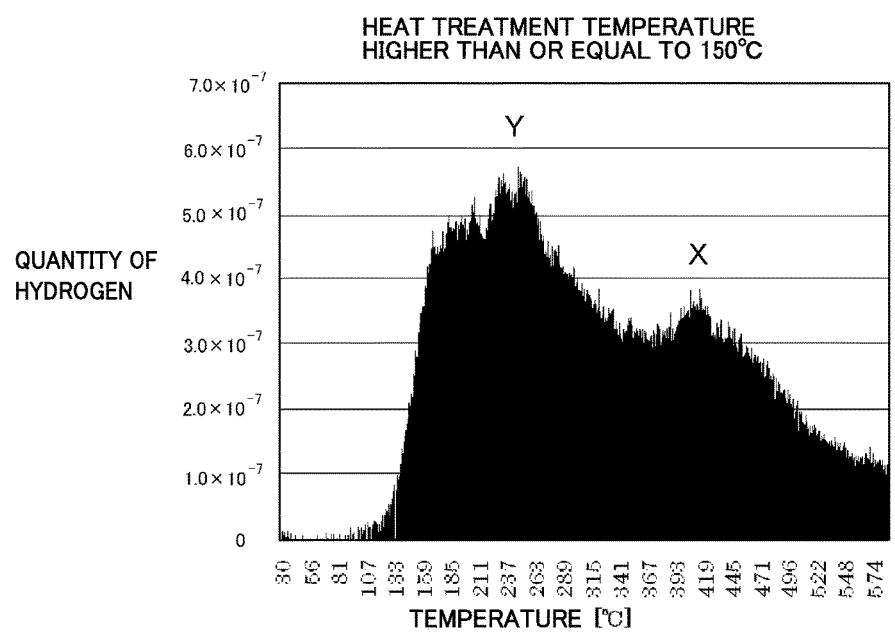
FIG. 8 represents a relationship between a temperature and a quantity of hydrogen in the TDS analysis for a sample which is heat-treated at higher than or equal to 150° C. and changed in a firing condition for the external electrodes.

FIG. 8 represents a relationship between a temperature and a quantity of hydrogen in the TDS analysis for a sample which was heat-treated at a temperature higher than or equal to 150° C. and changed in the firing condition for the external electrodes.

It was confirmed that the ratios shown in Table 1 are provided when, based on the results shown in FIGS. 4 to 7, ratios of arithmetic mean value Xb of a quantity of hydrogen generated per unit temperature in the range of higher than or equal to 490° C. and lower than or equal to 510° C. with respect to arithmetic mean value Y of a quantity of hydrogen generated per unit temperature in the range higher than or equal to 230° C. and lower than or equal to 250° C. (Xb/Y) are calculated respectively. In other words, it was confirmed that Xb/Y=0.74 was provided when the heat treatment was not performed, and Xb/Y=0.67 was provided when the heat treatment temperature was 85° C., and Xb/Y=0.55 was provided when the heat treatment temperature was 150° C., and Xb/Y=0.36 was provided when the heat treatment temperature was 600° C.

Moreover, it was confirmed that Xc/Y=0.66 was provided in the case where the heat treatment temperature was higher than or equal to 150° C. when, based on the result shown in FIG. 8, ratios of arithmetic mean value Xc of a quantity of hydrogen generated per unit temperature in the range higher than or equal to 400° C. and lower than or equal to 420° C. with respect to arithmetic mean value Y of a quantity of hydrogen generated per unit temperature in the range higher than or equal to 230° C. and lower than or equal to 250° C. (Xc/Y) were calculated.

Moreover, it was confirmed that Xa/Y≤0.66 and Xp/Y≤0.66 were provided when, based on the results shown in FIGS. 6 to 8, ratios of arithmetic mean value Xa and maximum value Xp of a quantity of hydrogen generated per unit temperature in the range higher than or equal to 350° C. with respect to arithmetic mean value Y of a quantity of hydrogen generated per unit temperature in the range higher than or equal to 230° C. and lower than or equal to 250° C. (Xa/Y and Xp/Y) were calculated respectively.

Moreover, it was confirmed that Xp/Y>0.66 was provided when, based on the results shown in FIGS. 4 and 5, ratios of maximum value Xp of a quantity of hydrogen generated per unit temperature in the range of higher than or equal to 350° C. with respect to arithmetic mean value Y of a quantity of hydrogen generated per unit temperature in the range higher than or equal to 230° C. and lower than or equal to 250° C. (Xp/Y) were calculated respectively.

It should be noted that the quantity of hydrogen in this evaluation test is a quantity of hydrogen of m/z=2 (hydrogen detected as hydrogen gas (H<2>)).

In the present invention, a quantity of hydrogen of m/z=2 (hydrogen gas) may be focused as in the case of this example, or may be focused on a quantity of hydrogen of m/z=1 to know a behavior of hydrogen.

Moreover, after performing the heat treatment, the PCBT test (high-temperature high-humidity load test) was conducted for the samples of the sample numbers 1 to 4 having the Sn-plating layer formed on the Ni-plating layer.

The PCBT test was conducted under the conditions of 125° C./95% RH/3.2V/72 hrs. It should be noted that, in the PCBT test, the number of evaluation samples for each sample of the sample numbers 1 to 4 was 20.

Then, an insulation resistance (IR) was measured for each sample. In terms of Log IR, the case where an IR value at the time of terminating the test is lowered from the IR value at the time of starting the test by 0.5 is taken as the IR deterioration.

The results of the PCBT test, in other words, the number of samples having deteriorated insulation resistance (the number of defects occurred) among the 20 evaluation samples provided in the test is shown in Table 1.

TABLE 1

| Sample Number | Heat Treatment Temperature (° C.) | Hydrogen Generation Ratio Xb/Y (—) | Number of Defects in PCBT Test (samples) n = 20 |
|---|---|---|---|
| *1 | No Heat Treatment | 0.74 | 20 |
| *2 | 85 | 0.67 | 11 |
| 3 | 150 | 0.55 | 0 |
| 4 | 600 | 0.36 | 0 |

The samples having * on the sample numbers are samples which are out of the scope of the present invention.

It should be noted that, in Table 1, the samples of the sample numbers 3 and 4 are samples satisfying the requirements of the present invention, and the samples of sample numbers 1 and 2 are samples not satisfying the requirements of the present invention.

As shown in Table 1, in the cases of the sample of the sample number 1 without the heat treatment and the sample of the sample number 2 heat-treated at 85° C. (samples not satisfying the requirements of the present invention), it was confirmed that a ratio of arithmetic mean value Xb of a quantity of hydrogen generated per unit temperature in the range higher than or equal to 490° C. and lower than or equal to 510° C. with respect to arithmetic mean value Y of a quantity of hydrogen generated per unit temperature in the range higher than or equal to 230° C. and lower than or equal to 250° C. (Xb/Y) was a value exceeding 0.66.

Moreover, it was confirmed that, in the case of the sample of the sample number 1 (the sample without the heat treatment) not satisfying the requirements of the present invention, the number of defects occurred in the PCBT test was 20, and defect occurred in all of the samples. Moreover, it was confirmed that, also in the case of the samples of sample number 2, the number of defects occurred in the PCBT test was 11, which is a large number.

On the other hand, in the samples of the sample numbers 3 and 4 which were heat-treated at 150° C. and 600° C. (samples satisfying the requirements of the present invention), it was confirmed that a ratio of arithmetic mean value Xb of a quantity of hydrogen generated per unit temperature in the range higher than or equal to 490° C. and lower than or equal to 510° C. with respect to arithmetic mean value Y of a quantity of hydrogen generated per unit temperature in the range higher than or equal to 230° C. and lower than or equal to 250° C. (Xb/Y) was a value less than or equal to 0.66.

Then, it was confirmed that no occurrence of defect in the PCBT test could be confirmed in the cases of the samples of the sample numbers 3 and 4 (samples satisfying the requirements of the present invention).

From these results, it was confirmed that, by forming the Ni-plating layer on the surface of the external electrode main body by the electroplating and thereafter heat-treating the ceramic element body having Ni-plating layer under the temperature condition of higher than or equal to 150° C., hydrogen contained in the ceramic element body having the Ni-plating layer and partially absorbed in the internal electrode can be emitted to outside, and the quantity of hydrogen causing deterioration of the dielectric layer can be reduced, so that a highly reliable multilayer ceramic capacitor without causing deterioration of the insulation resistance can be obtained consequently.

It should be noted that, although the example of the case of forming the Ni-plating layer on the surface of the external electrode main body was described in the embodiment described above, the present invention can be applied also to multilayer ceramic capacitors including a plating layer of Ni alloy or a plating layer of alloy containing, for example, Cu, Pd, Au, Cr, Xn, Pt, Ag, Fe other than Ni.

Moreover, although the example of the case where the external electrode main body is a baked electrode of Cu was described in the embodiment described above, the present invention can be applied also to the case where the external electrode main body is a baked electrode of Ni or Ag, or the case where the external electrode main body is a resin electrode containing a conductive component rather than the baked electrode.

Moreover, although the Sn-plating layer is formed as a plating layer formed on the surface of the Ni-plating layer in the embodiment, a solder plating layer can be formed, for example, other than the Sn-plating layer. Further, other than the Sn-plating layer or the solder plating layer, a Pd-plating layer, a Cu-plating layer, an Au-plating layer, or the like can be formed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A multilayer ceramic capacitor, comprising:
a layered body in which dielectric layers made of a ceramic dielectric material and internal electrode layers having a base metal as a main component thereof are layered alternately; and
an external electrode having an external electrode main body on a surface of said layered body and conductively connected to said internal electrodes drawn out to the surface of said layered body, and a plating layer on a surface of said external electrode main body,
said external electrode main body containing Cu; and
a protective layer containing $Cu_2O$ at a joining portion between said external electrode main body and said plating layer,
wherein, when heat is applied to said layered body after said external electrode is removed therefrom, and a quantity of hydrogen generated from said layered body is measured, a ratio of an arithmetic mean value Xa of a quantity of hydrogen generated per unit temperature in a range higher than or equal to 350° C. with respect to an arithmetic mean value Y of a quantity of hydrogen generated per unit temperature in a range higher than or equal to 230° C. and lower than or equal to 250° C. (Xa/Y) is less than or equal to 0.66.

2. The multilayer ceramic capacitor according to claim 1, wherein said plating layer is a composite plating layer including an Ni-plating layer and an Sn-plating layer on said Ni-plating layer.

3. The multilayer ceramic capacitor according to claim 2, wherein said protective layer further contains CuO.

4. The multilayer ceramic capacitor according to claim 1, wherein said protective layer further contains CuO.

5. The multilayer ceramic capacitor according to claim 1, wherein, when said heat is applied to said layered body after said external electrode is removed therefrom, and said quantity of the hydrogen generated from said layered body is measured, a ratio of an arithmetic mean value Xb of a quantity of hydrogen generated per unit temperature in a range of higher than or equal to 490° C. and lower than or equal to 510° C. with respect to Y (Xb/Y) is less than or equal to 0.66.

6. The multilayer ceramic capacitor according to claim 1, wherein, when said heat is applied to said layered body after said external electrode is removed therefrom, and said quantity of the hydrogen generated from said layered body is measured, a ratio of an arithmetic mean value Xc of a quantity of hydrogen generated per unit temperature in a range higher than or equal to 400° C. and lower than or equal to 420° C. with respect to Y (Xc/Y) is less than or equal to 0.66.

7. A multilayer ceramic capacitor, comprising:
a layered body in which dielectric layers made of a ceramic dielectric material and internal electrode layers having a base metal as a main component thereof are layered alternately; and
an external electrode having an external electrode main body on a surface of said layered body and conductively connected to said internal electrodes drawn out to the surface of said layered body, and a plating layer on a surface of said external electrode main body,
said external electrode main body containing Cu; and
a protective layer containing $Cu_2O$ at a joining portion between said external electrode main body and said plating layer,
wherein, when heat is applied to said layered body after said external electrode is removed therefrom, and a quantity of hydrogen generated from said layered body is measured, a ratio of a maximum value Xp of a quantity of hydrogen generated per unit temperature in a range higher than or equal to 350° C. with respect to an arithmetic mean value Y of a quantity of hydrogen generated per unit temperature in a range higher than or equal to 230° C. and lower than or equal to 250° C. (Xp/Y) is less than or equal to 0.66.

8. The multilayer ceramic capacitor according to claim 7, wherein said plating layer is a composite plating layer including an Ni-plating layer and an Sn-plating layer on said Ni-plating layer.

9. The multilayer ceramic capacitor according to claim 8, wherein said protective layer further contains CuO.

10. The multilayer ceramic capacitor according to claim 7, wherein said protective layer further contains CuO.

11. A method for manufacturing a multilayer ceramic capacitor, the method comprising:
forming a layered body in which dielectric layers made of a ceramic dielectric material and internal electrode layers having a base metal as a main component are layered alternately;
forming an external electrode main body on a surface of said layered body so as to be conductively connected to said internal electrodes drawn out to the surface of said layered body;
forming a plating layer on a surface of said external electrode main body by electroplating to form a ceramic element main body; and
heat-treating the ceramic element body under a temperature condition higher than or equal to 150° C. so as to emit hydrogen taken into said ceramic element body during said electroplating to an outside of the ceramic element main body.

12. The method for manufacturing a multilayer ceramic capacitor according to claim 11, wherein said external electrode main body contains Cu, and the method further comprises performing an oxidation treatment to said external electrode main body containing Cu.

13. The method for manufacturing a multilayer ceramic capacitor according to claim 12, wherein said oxidation treatment is performed under a condition in which a protective layer containing $Cu_2O$ or a protective layer containing $Cu_2O$ and CuO is formed on a surface of said external electrode main body.

14. The method for manufacturing a multilayer ceramic capacitor according to claim 11, wherein said step of forming said plating layer includes forming an Ni-plating layer on a surface of said external electrode main body by electroplating, and forming an Sn-plating layer on a surface of said Ni-plating layer by electroplating after said heat treatment.

* * * * *